(12) United States Patent
Matsushita

(10) Patent No.: US 9,887,572 B2
(45) Date of Patent: Feb. 6, 2018

(54) BATTERY PACK AND CONTROL METHOD FOR CONTROLLING OUTPUT OF BATTERY PACK FOR CONNECTING EXTERNAL LOAD

(71) Applicant: Kabushiki Kaisha Toshiba, Minato-ku (JP)

(72) Inventor: Hiroki Matsushita, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 82 days.

(21) Appl. No.: 15/007,609

(22) Filed: Jan. 27, 2016

(65) Prior Publication Data

US 2017/0005482 A1 Jan. 5, 2017

(30) Foreign Application Priority Data

Jun. 30, 2015 (JP) ................................. 2015-130661

(51) Int. Cl.
*H02J 7/00* (2006.01)

(52) U.S. Cl.
CPC ............ *H02J 7/007* (2013.01); *H02J 7/0063* (2013.01)

(58) Field of Classification Search
CPC ................................ H02J 7/0063; H02J 7/007
USPC ........................................................ 320/136
See application file for complete search history.

(56) References Cited

U.S. PATENT DOCUMENTS

| | | |
|---|---|---|
| 2002/0177034 A1 | 11/2002 | Kimura et al. |
| 2005/0242779 A1 | 11/2005 | Yoshio |
| 2007/0070558 A1 | 3/2007 | Liu |
| 2011/0045323 A1* | 2/2011 | Ooi ...................... H01M 2/1066 429/50 |
| 2011/0068819 A1* | 3/2011 | Sims ...................... G01R 31/40 324/764.01 |
| 2011/0234168 A1* | 9/2011 | Park ...................... H02J 7/0063 320/132 |

(Continued)

FOREIGN PATENT DOCUMENTS

| | | |
|---|---|---|
| EP | 1 263 110 A2 | 12/2002 |
| JP | 2011-72389 A | 4/2011 |

(Continued)

OTHER PUBLICATIONS

Extended European Search Report dated Dec. 1, 2016 in Patent Application No. 16152708.0.

(Continued)

*Primary Examiner* — Nathaniel Pelton
(74) *Attorney, Agent, or Firm* — Oblon, McClelland, Maier & Neustadt, L.L.P.

(57) ABSTRACT

According to one embodiment, a battery pack for connecting an external load via a switch is produced. The output-limiting resistor is used to limit an output current value. And the output-limiting resistor is configured to implement three different resistance values. The switching module is configured to switch a resistance value of the output-limiting resistor to one of the three different resistance values. The measurement module is configured to measure the output current value and a voltage value of the external load. And the control module is configured to perform control for connecting the external load to the battery pack via the switch (SW0) without the output-limiting resistor.

6 Claims, 8 Drawing Sheets

(56) References Cited

U.S. PATENT DOCUMENTS

2015/0061376 A1* 3/2015 Hartl ..................... B60R 16/02
307/9.1

FOREIGN PATENT DOCUMENTS

| JP | 5615995 | 10/2014 |
| WO | WO 2012/114479 A1 | 8/2012 |

OTHER PUBLICATIONS

Office Action dated Oct. 21, 2016 in Australian Patent Application No. 2016200422.
Australian Office Action dated May 5, 2017 in Patent Application No. 2016200422.
Japanese Office Action dated Jun. 6, 2017 in Patent Application No. 2015-130661.

* cited by examiner

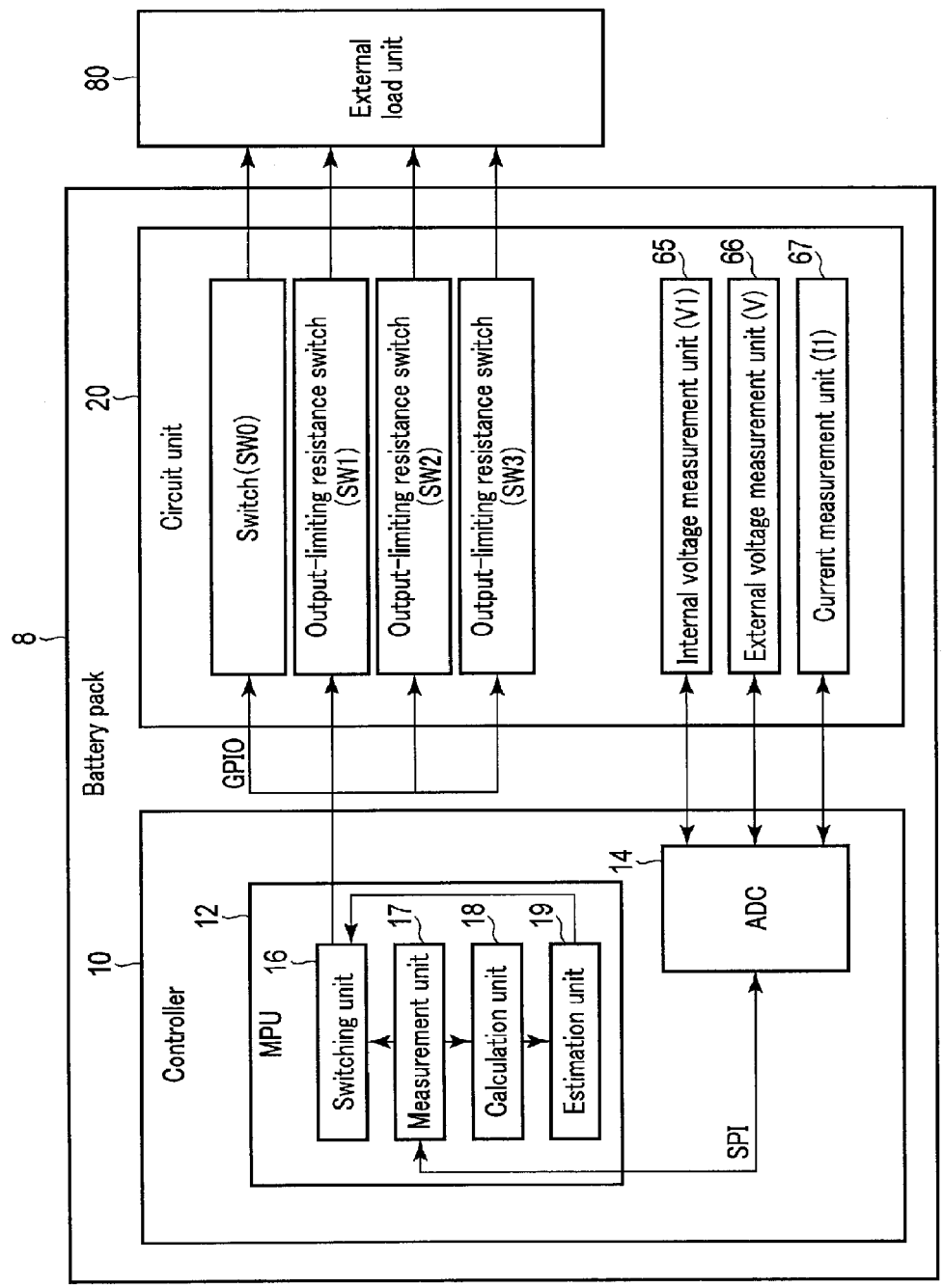
F I G. 6

| | Switch (SW0) closing determination | Switch closing determination feasibility | | |
|---|---|---|---|---|
| | | Constant-current load (b) | Resistance load (c) | Battery load (d) |
| Related art | $|V1-V| < \Delta V$ | ✗ Determination criterion of switch closing is sometimes not satisfied because $|V1 - V|$ maintains predetermined value $(R1*I1)$ | ✗ Determination criterion of switch closing is sometimes not satisfied because $|V1 - V|$ maintains predetermined value $(E1 - E1(R3/(R1 + R3)))$ | ○ $|V1 - V|$ reduces with elapse of time, and switch finally closes |
| Embodiment | $I1max\_0 < I1max\_SW0$ | ○ It is determined by load determination that load is constant-current load, and switch closing determination is satisfied when time elapses even if voltage difference is produced | ○ It is determined by load determination that load is resistance load, and switch closing determination is satisfied when time elapses even if voltage difference is produced | ○ $|V1 - V|$ reduces with elapse of time, and switch finally closes |

F I G. 9

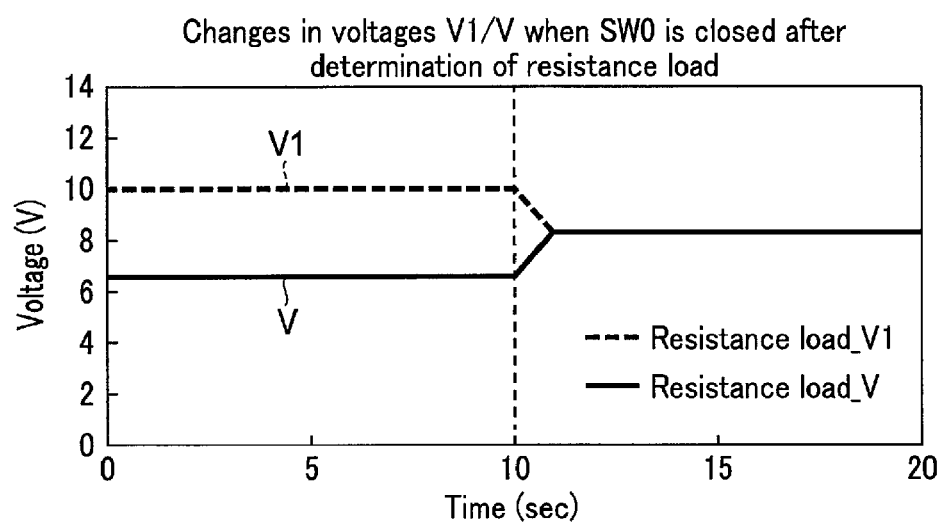
F I G. 10

BATTERY PACK AND CONTROL METHOD FOR CONTROLLING OUTPUT OF BATTERY PACK FOR CONNECTING EXTERNAL LOAD

CROSS-REFERENCE TO RELATED APPLICATIONS

This application is based upon and claims the benefit of priority from the Japanese Patent Application No. 2015-130661, filed Jun. 30, 2015, the entire contents of which are incorporated herein by reference.

FIELD

Embodiments described herein relate generally to a battery pack and control method for connecting an external load.

BACKGROUND

Conventionally, a high-output battery pack includes a switch between an internal battery and external load for safety's sake, and a main circuit is disconnected from the external load by opening the switch when the battery pack is not in use.

When using the battery pack, the internal battery of the battery pack can be connected to the external load by closing the switch. However, if a voltage difference (to be referred to as "an internal-external voltage difference" hereinafter) between the internal battery and external load is large, a large electric current flows when they are connected, so a component of the switch or the like is sometimes broken.

Accordingly, the following method is known as an example of a control method of suppressing this large electric current when connecting the battery and load. That is, this method measures the internal-external voltage difference, and, if the measured internal-external voltage difference is larger than a predetermined value, connects the external load via an output-limiting resistance for limiting an electric current to be output to the external load. The control method closes the switch if the internal-external voltage difference becomes smaller than the predetermined value.

This conventional control method will briefly be explained with reference to FIG. 1. FIG. 1 shows a circuit example of a conventional battery pack 60 and an external load unit 80 connected to the battery pack 60. Note that in addition to the circuit as shown in FIG. 1, the battery pack 60 includes a controller (not shown) for controlling elements forming the circuit.

The battery pack 60 is a battery pack such as a lithium-ion battery. The battery pack 60 includes an internal battery unit 61, switch SW0, internal voltage measurement unit 65, external voltage measurement unit 66, current measurement unit 67, positive terminal 68, negative terminal 69, and output-limiting resistance unit 70.

Also, the internal battery unit 61 includes an internal battery 62 and internal battery resistance 63. The output-limiting resistance unit 70 includes an output-limiting resistor 72 having a resistance value R01, and an output-limiting resistance switch SW1.

On the other hand, the external load unit 80 to be connected to the battery pack 60 includes a battery load unit 82 and resistance/coil/capacitance load unit 83. The battery load unit 82 includes an external battery 85 and external battery resistor 84. The resistance/coil/capacitance load unit 83 includes a resistance/coil/capacitance load 86 which is one of a resistance load, coil load, and capacitance load. For example, the coil load is that of a starter installed in a vehicle.

In this arrangement, the external load unit 80 includes the battery load unit 82, and this produces a voltage difference (V1−V) (to be referred to as "an internal-external voltage difference" hereinafter) between an internal voltage V1 measured by the internal voltage measurement unit 65 of the battery load unit 82, and an external voltage V measured by the external voltage measurement unit 66.

This internal-external voltage difference disappears with the elapse of time as shown in FIG. 2. FIG. 2 is an example of a graph schematically showing changes in internal voltage V1 and external voltage V with time, when the output-limiting resistance switch SW1 is closed with the battery load unit 82 being included in the external load unit 80.

Initially, the internal voltage V1 is 12 V, and the external voltage V is 8 V, so there is an internal-external voltage difference. Then, the internal-external voltage difference gradually decreases because an electric current I1 measured by the current measurement unit 67 flows through the output-limiting resistance unit 70. When a few ten hours (e.g., ten hours) elapse, the internal-external voltage difference disappears, and the battery pack 60 and external load unit 80 are completely connected by closing the switch SW0.

Unfortunately, even when using the conventional control method as described above, a large electric current may flow when the battery pack 60 is connected to the external load unit 80 if the internal-external voltage difference is large.

Also, when the external load is a battery load, coil load, or capacitance load, the internal-external voltage difference can be eliminated through the output-limiting resistor as described above. However, when an external load unit 90 includes a resistance load unit 92 or constant-current load unit 93 as shown in FIG. 3, the internal-external voltage difference keeps taking a predetermined value as shown in FIGS. 4 and 5. Accordingly, the internal-external voltage difference does not disappear but takes the predetermined value, so the switch SW0 cannot be closed even after the elapse of time.

Assume that, as shown in FIG. 3, the external load unit 90 includes the resistance load unit 92 including a resistor 94 and a constant-current load 93 including a constant-current source 95. Assume also a conventional control method using only the internal-external voltage difference as a closing determination condition for determining whether to close the switch SW0. In this case, even when the switch SW0 can safely be closed, it is determined that the switch SW0 cannot be closed because the internal-external voltage difference keeps taking the predetermined value.

FIG. 4 is an example of a graph schematically showing changes in internal voltage V1 and external voltage V with time, when the external load unit 90 includes the resistance load unit 92, and the output-limiting resistance switch SW1 is closed.

As shown in FIG. 4, the internal voltage V1 is 10 V, the external voltage V is about 6.5 V, and the internal voltage V1 and external voltage V keep taking the predetermined values even when time elapses. Since the internal-external voltage difference does not disappear, therefore, the switch SW0 cannot be closed, so the resistance load cannot be connected.

Likewise, FIG. 5 is an example of a graph schematically showing changes in internal voltage V1 and external voltage V with time, when the external load unit 90 includes the constant-current load unit 93, and the output-limiting resistance switch SW1 is closed.

As shown in FIG. 5, the internal voltage V1 is 10 V, the external voltage V is about 9.5 V, and the internal voltage V1 and external voltage V keep taking the predetermined values even when time elapses. Since the internal-external voltage difference does not disappear, therefore, the switch SW0 cannot be closed, so the constant-current load cannot be connected.

From the foregoing, it is desirable to provide a battery pack and control method for safely and reliably connecting an external load.

BRIEF DESCRIPTION OF THE DRAWINGS

FIG. 6 is a block diagram showing a configuration example of a battery pack of an embodiment;

FIG. 9 shows a switch closing determination feasibility table showing whether to close a switch SW0, when a battery control method performed by the battery pack of the embodiment is applied; and FIG. 10 is a graph schematically showing examples of changes in internal voltage and external voltage with time, when the battery control method performed by the battery pack of the embodiment is applied, and the external load unit includes a resistance load unit.

DETAILED DESCRIPTION

In general, according to one embodiment, a battery pack for connecting an external load via a switch includes an output-limiting resistor, a switching module, a measurement module, and a control module. The output-limiting resistor is arranged between an internal battery of the battery pack and the external load. The output-limiting resistor is used to limit an output current value to be output to the external load. And the output-limiting resistor is configured to implement three different resistance values of a first resistance value, a second resistance value, and a third resistance value. The switching module is configured to switch a resistance value of the output-limiting resistor to one of the first resistance value, the second resistance value, and the third resistance value. The measurement module is configured to measure the output current value and a voltage value of the external load, for each of the first resistance value, the second resistance value, and the third resistance value. And the control module is configured to perform, in accordance with an external load estimated based on the measurement result, control for connecting the external load to the battery pack via the switch (SW0) without the output-limiting resistor.

Various embodiments will be described hereinafter with reference to the accompanying drawings.

FIG. 6 is a block diagram showing a configuration example of a battery pack 8 of an embodiment. The battery pack 8 includes a controller 10 and circuit unit 20. Assume that the battery pack 8 is a battery pack including a lithium-ion battery, a battery pack to be used as an engine starting battery mounted in a vehicle or the like, or a battery pack to be used as a portable battery.

Figure 7:
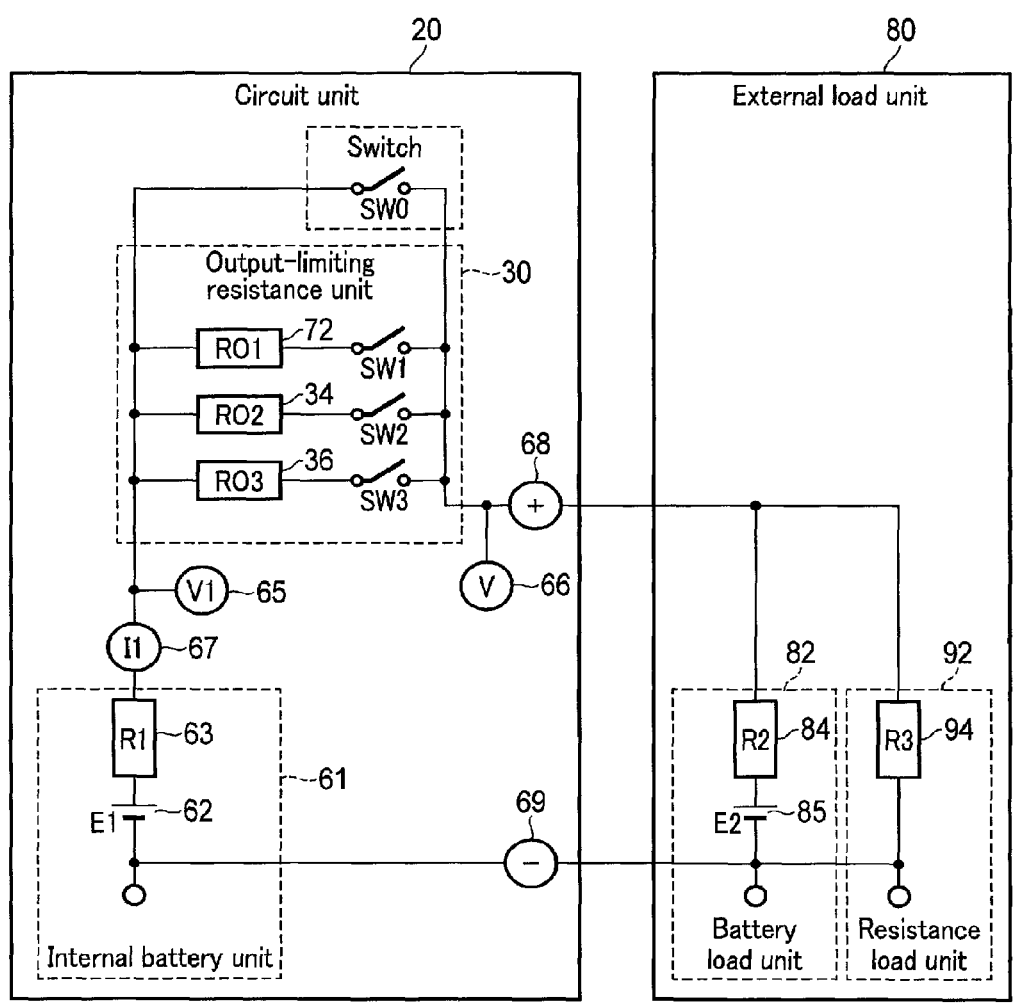
FIG. 7 is a circuit diagram showing an example of a circuit unit of the battery pack of the embodiment and an external load unit.

FIG. 7 is a circuit diagram showing an example of the circuit unit 20 of this embodiment connected to an external load unit 80.

The controller 10 is implemented as, e.g., a battery management system (BMS) for controlling the circuit unit 20. Note that the controller 10 need not be installed inside the battery pack 8, and may also be provided outside the battery pack 8.

The controller 10 performs control for connecting the circuit unit 20 to the external load unit 80 via a switch SW0 of the circuit unit 20. To implement this control, the controller 10 includes an MPU 12 and analog-digital converter (ADC) 14.

The MPU 12 is connected to the ADC 14 by, e.g., an SPI (Serial Peripheral Interface), and is connected to an internal voltage measurement unit 65, external voltage measurement unit 66, and current measurement unit 67 in the circuit unit 20 via the ADC 14.

Also, the MPU 12 acquires, via the ADC 14, information (to be referred to as "measurement information" hereinafter) indicating an internal voltage (V1), external voltage (V), and electric current (I1) respectively measured by the internal voltage measurement unit 65, external voltage measurement unit 66, and current measurement unit 67.

Furthermore, the MPU 12 is connected to the switch SW0 and output-limiting resistance switches SW1, SW2, and SW3 in the circuit unit 20 by, e.g., a GPIO (General Purpose Input/Output). Note that as shown in the circuit diagram of FIG. 7, the output-limiting resistance switches SW1, SW2, and SW3 are arranged between an internal battery 62 of the circuit unit 20 and the external load unit 80. Each of the output-limiting resistance switches SW1, SW2, and SW3 is used to limit an electric current to be output to the external load unit 80. The output-limiting resistance switches SW1, SW2, and SW3 are also switches for controlling output-limiting resistors (precharges) for implementing three different resistance values R01, R02, and R03, respectively. Note that the output current value is, for example, the value of the electric current (I1). Note also that the output-limiting resistance switches SW1, SW2, and SW3 are respectively associated with the output-limiting resistors for implementing the three different resistance values.

Based on the measurement information, for example, the MPU 12 transmits control signals for controlling the switch SW0 and output-limiting resistance switches SW1, SW2, and SW3 to these switches. To implement this, the MPU 12 includes a switching unit 16, measurement unit 17, calculation unit 18, and estimation unit 19.

The switching unit 16 performs control for switching the resistance value of the output-limiting resistor to one of the three different resistance values. For example, the switching unit 16 performs control for switching the output-limiting resistance switches SW1, SW2, and SW3 associated with the three different resistance values. Also, in accordance with an instruction for switching the resistance values from the measurement unit 17 (to be described below), the switching unit 16 performs control for switching the output-limiting resistance switches SW1, SW2, and SW3. Furthermore, the switching unit 16 performs control for closing the switch SW0 in accordance with an instruction for closing the switch SW0 from the estimation unit 19 (to be described later).

For each of the three different resistance values switched by the switching unit 16, the measurement unit 17 performs at least control for measuring the output current value and the voltage value of the external load unit 80 contained in the measurement information. For example, to acquire the measurement information for the output-limiting resistor associated with the output-limiting resistance switches SW1, SW2, and SW3 switched by the switching unit 16, the measurement unit 17 performs control which causes the internal voltage measurement unit 65, external voltage measurement unit 66, and current measurement unit 67 to measure the measurement information via the ADC 14.

Then, the measurement unit 17 acquires the measurement information from the internal voltage measurement unit 65, external voltage measurement unit 66, and current measurement unit 67 via the ADC 14. In addition, when the measurement information is thus acquired, the measurement unit 17 transmits an instruction for switching the resistance values of the output-limiting resistors to the switching unit 16, in order to acquire measurement information different from the acquired measurement information.

Based on the measurement information acquired by the measurement unit 17, the calculation unit 18 calculates a voltage value E2 corresponding to an external battery 85, a resistance value R2 corresponding to an external battery resistor 84, and a resistance value R3 corresponding to a resistance load 94, which are three unknown values (to be described later), i.e., three unknowns. Note that in this embodiment, it is assumed that the load of the external load unit 80 is not known unlike in the related art. Therefore, these unknowns must be calculated.

Also, based on the measurement information, the calculation unit 18 calculates an output current value (to be referred to as "an estimated output current value" hereinafter) before the external load unit 80 is connected to the circuit unit 20 via the switch SW0 without any output-limiting resistor. In other words, the calculation unit 18 calculates an output current value if the switch SW0 is closed.

Based on the voltage value E2, resistance value R2, and resistance value R3 calculated by the calculation unit 18, the estimation unit 19 estimates the load value of the external load unit 80 or the type of external load of the external load unit 80. Determining the external load as a result of the estimation by the estimation unit 19 as described above will be referred to as "load determination" hereinafter. Also, the load value is a value such as the voltage value E2, resistance value R2, or resistance value R3 associated with the external load of the external load unit 80. Note that the external load estimation method and determination method such as load determination as described above will be described in detail later with reference to FIG. 9.

The estimation unit 19 also determines whether to close the switch SW0 based on the estimation result. For example, the estimation unit 19 estimates the load value of the external load unit 80 based on the voltage value E2, resistance value R2, and resistance value R3 calculated by the calculation unit 18. Then, the estimation unit 19 estimates the type of external load of the external load unit 80 in accordance with the estimated load value. After that, based on the estimated type of the external load and the calculated estimated output current value, the estimation unit 19 determines whether to connect the circuit unit 20 and external load unit 80 via the switch SW0, i.e., whether to close the switch SW0.

In accordance with, e.g., the estimated load value, estimated external load type, or estimated output current value, the MPU 12 performs control for connecting the external load unit 80 to the circuit unit 20 via the switch SW0 without any output-limiting resistor.

For example, when the estimated output current value is smaller than an allowable current value of the circuit unit 20, the estimation unit 19 determines that the switch SW0 can be closed. Then, the estimation unit 19 instructs the switching unit 16 to close the switch SW0.

Next, examples of the circuit configurations of the circuit unit 20 and external load unit 80 will be explained with reference to FIG. 7. Note that an explanation of the same arrangements or contents as those shown FIG. 1 or 3 will be omitted.

Figure 1:
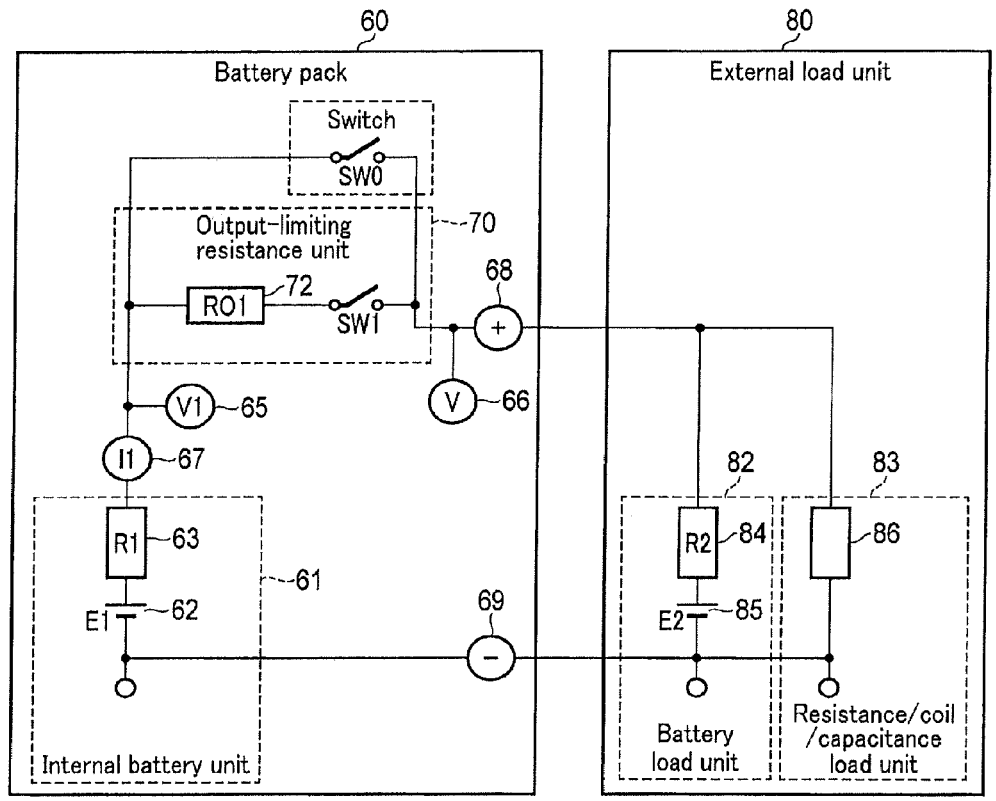
FIG. 1 is a circuit diagram showing an example of a circuit unit of a conventional battery pack and an external load unit.
Figure 3:
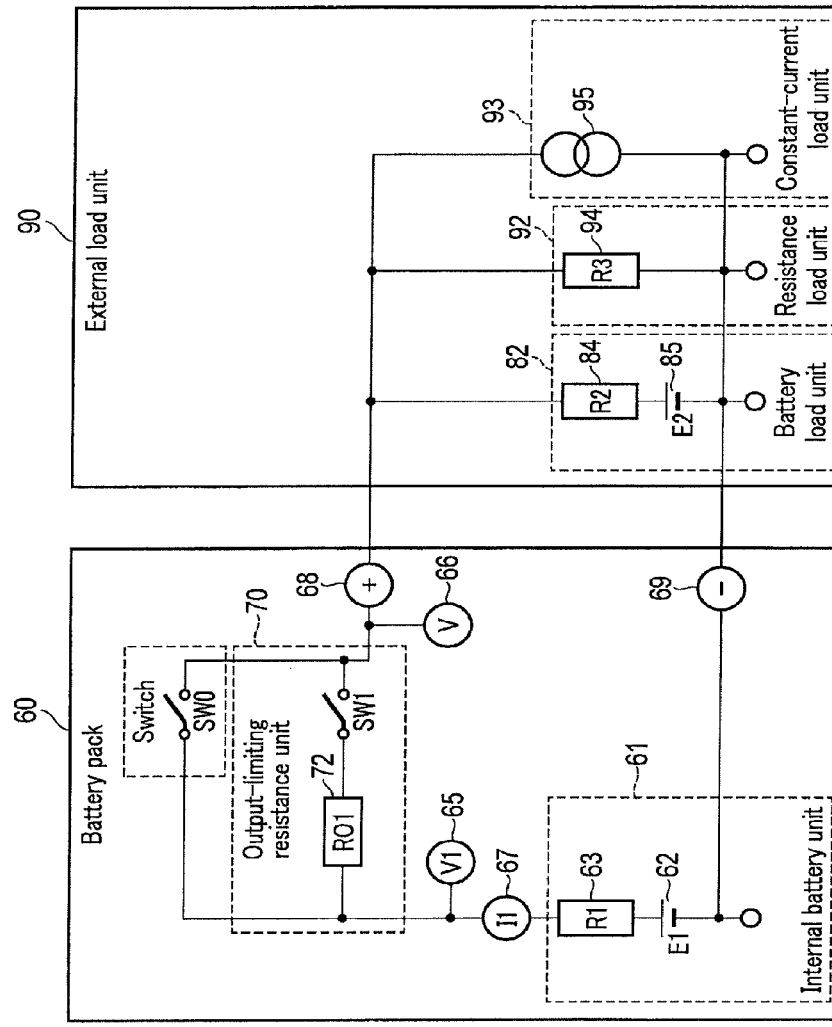
FIG. 3 is a circuit diagram showing another example of the circuit unit of the conventional battery pack and the external load unit.
Figure 4:
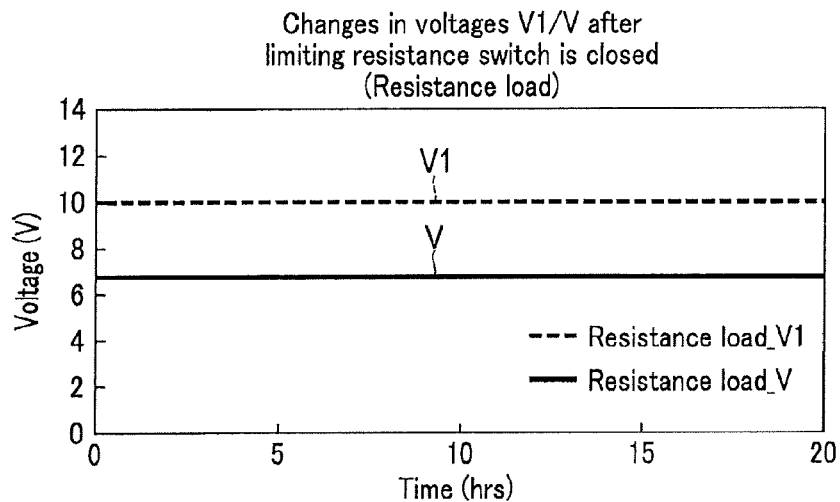
FIG. 4 is a graph schematically showing examples of changes in internal voltage and external voltage with time, when the battery control method performed by the conventional battery pack is applied, and the external load unit includes a resistance load unit.
Figure 5:
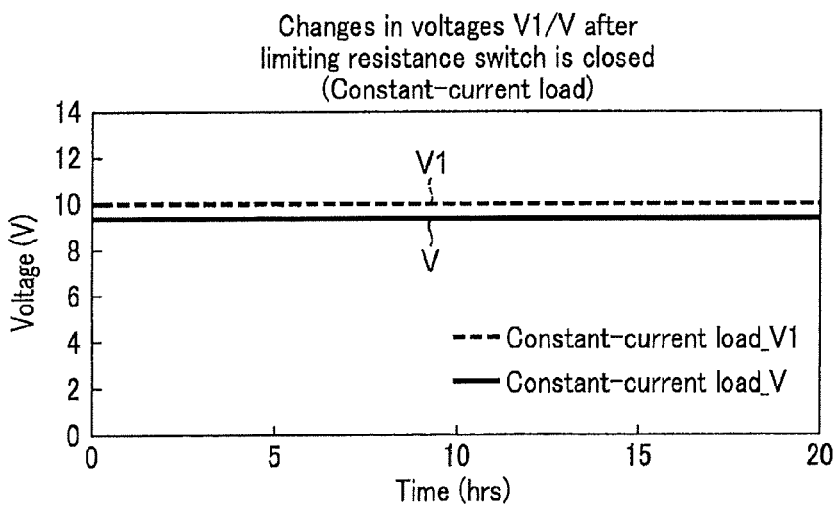
FIG. 5 is a graph schematically showing examples of changes in internal voltage and external voltage with time, when the battery control method performed by the conventional battery pack is applied, and the external load unit includes a constant-current load unit.

Unlike the battery pack 60 of the related art as shown in FIGS. 1 and 3, the circuit unit 20 includes a plurality of output-limiting resistors. For example, an output-limiting resistance unit 30 includes an output-limiting resistor 34 having the resistance value R02 and the output-limiting resistance switch SW2, and an output-limiting resistor 36 having the resistance value R03 and the output-limiting resistance switch SW3, in addition to an output-limiting resistor 72 having the resistance value R01 and the output-limiting resistance switch SW1. The resistance values R01, R02, and R03 have a relationship R01>R02>R03. For example, the resistance values R01, R02, and R03 are respectively about 30, 20, and 10Ω. However, the resistance values R01, R02, and R03 can be changed in accordance with the value of the external battery voltage 85, external battery resistor 84, or resistor 94 in the external load unit 80 or 90.

The output-limiting resistance switches SW1, SW2, and SW3 are respectively switches for controlling the output-limiting resistors 72, 34, and 36.

The switch SW0 is connected in parallel to the output-limiting resistance unit 30. The switch SW0 is a switch for connecting the circuit unit 20 and external load unit 80 without the output-limiting resistors 72, 34, and 36. That is, the switch SW0 is equivalent to an output-limiting resistance value of 0Ω.

An internal battery unit 61 includes the internal battery 62 having a voltage value E1, and an internal battery resistor 63 connected to the internal battery 62 and having a resistance value R1. Assume that the voltage value E1 is about 10 or 20 V.

The internal voltage measurement unit 65 measures the internal voltage (V1) as the voltage of the internal battery unit 61 with respect to ground.

The external voltage measurement unit 66 measures the voltage of the external load unit 80 with respect to ground, i.e., the external voltage (V) as the voltage between a positive terminal 68 and negative terminal 69.

The current measurement unit 67 is connected between the internal battery unit 61 and the output-limiting resistance unit 30 or switch SW0. The current measurement unit 67 measures the output current (I1) to the external load unit 80.

On the other hand, the external load unit 80 includes a modeled circuit including three parameters, i.e., the external battery 85 having the voltage value E2, the external battery resistor 84 connected in series with the external battery 85 and having the resistance value R2, and a resistance load 94 connected in parallel to the external battery 85 and external battery resistor 84 and having the resistance value R3.

The number of resistance values to be implemented by the output-limiting resistance unit 30 is set to be equal to the number of parameters. That is, when the external load unit 80 is a modeled circuit including three parameters as described above, the number of resistance values to be implemented by using, e.g., the output-limiting resistors 72, 34, and 36 is also set to three.

To implement the three resistance values, the circuit configuration example shown in FIG. 7 shows the three parallel-connected fixed resistance values R01, R02, and R03 to be selectively used. However, the circuit for implementing the three resistance values is not limited to this configuration.

For example, FIG. 7 shows the three output-limiting resistors 72, 34, and 36, but the circuit need only include at least two output-limiting resistors. This is so because if, for example, the circuit includes the output-limiting resistors 34 and 36, the three resistance values can be implemented by the resistance value R02, the resistance value R03, and a synthetic resistance value of the resistance values R02 and R03.

It is also possible to implement the three resistance values by using one variable resistor and properly changing its resistance value.

Also, even the external load unit 90 including the constant-current load unit 93 as shown in FIG. 3 can be regarded as a model like the external load unit 80 shown in FIG. 7 by handling the constant-current load unit 93 such that the battery unit voltage E2 in the battery load unit 82 shown in FIG. 7 has a minus value.

Note that as described previously, the resistance values R01, R02, and R03 can also be changed in accordance with the value of the external battery voltage 85, external battery resistor 84, or resistor 94, i.e., the voltage value E2, resistance value R2, or resistance value R3. In other words, the resistance values R01, R02, and R03 can also be changed in accordance with a value assuming the load value of the external load unit 80.

Assume a case in which it is already known that the resistance value R2 or R3 is a milliohm-order value. In this case, the resistance values R01, R02, and R03 can be so changed as to decrease the differences between them, within the range of resistance values by which the current value I1 is an ampere-order value (e.g., 10 A). More specifically, when the resistance values R01, R02, and R03 are 30, 20, and 10Ω, the resistance values R01, R02, and R03 can be changed to 25, 20, 15Ω.

Figure 8:
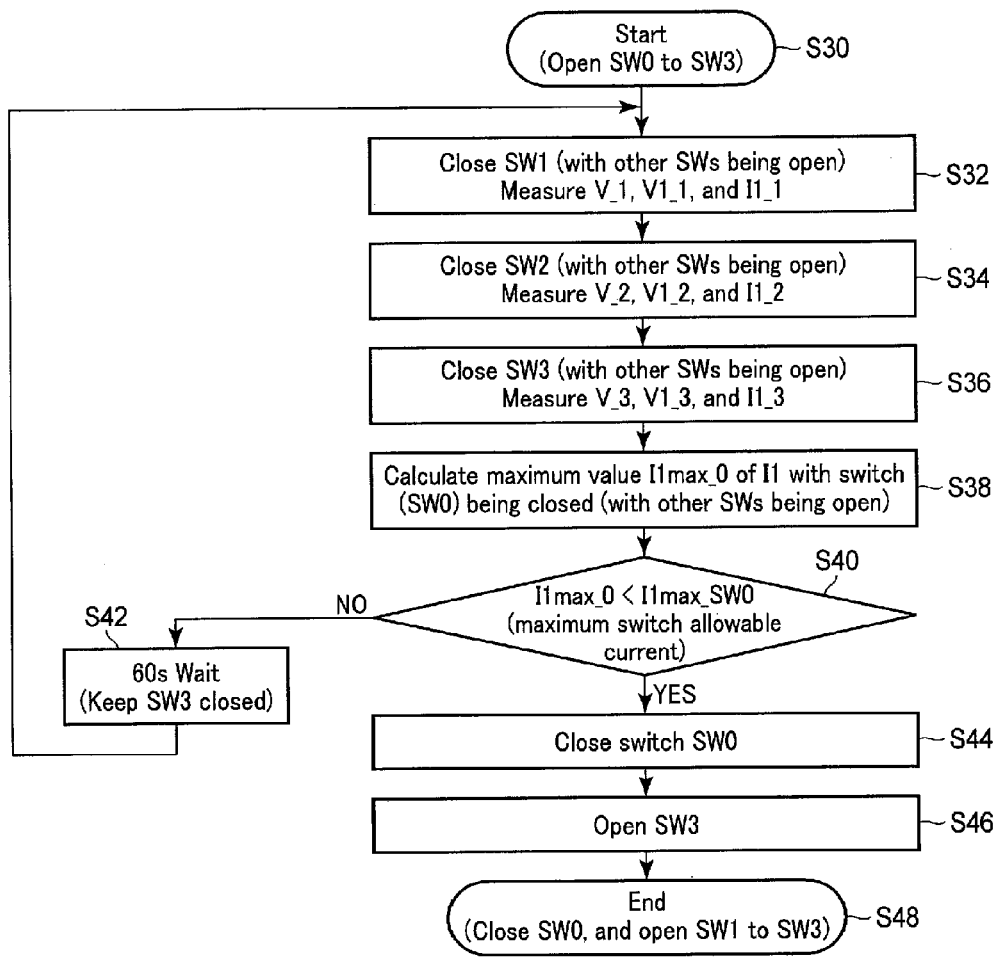
FIG. 8 is a flowchart showing an example of a battery control procedure performed by the battery pack of the embodiment.

Next, the procedure of a battery control method using the battery pack 8 will be explained with reference to FIG. 8.

First, an outline of the battery control method of this embodiment will be explained. The switching unit 16 switches the output-limiting resistors 72, 34, and 36 in, e.g., descending order of resistance value. Then, based on the internal voltage (V1), external voltage (V), and output current (I1) measured in their respective connection states, the calculation unit 18 calculates the voltage value E2, resistance value R2, and resistance value R3 as the three parameters of the modeled circuit.

Subsequently, the calculation unit 18 calculates the current value I1 when the switch SW0 is closed, as the estimated output current value. After that, the estimation unit 19 determines whether the calculated current value I1 is equal to or smaller than a specified value. If the calculated current value I1 is equal to or smaller than the specified value, the switching unit 16 closes the switch SW0.

Details of the procedure of the battery control method will now be explained below.

First, the switching unit 16 opens the switch SW0 and output-limiting resistance switches SW1, SW2, and SW3 (step S30). Then, the output-limiting resistance switch SW1 is closed with the switch SW0 and output-limiting resistance switches SW2 and SW3 being kept open (step S32).

Subsequently, the internal voltage (V1), external voltage (V), and output current (I1) are measured with the output-limiting resistance switch SW1 being closed (step S32). The internal voltage (V1), external voltage (V), and output current (I1) obtained by this measurement are respectively regarded as an internal voltage (V1_1), external voltage (V_1), and output current (I1_1).

Similarly, the output-limiting resistance switch SW2 is closed with the switch SW0 and output-limiting resistance switches SW1 and SW3 being kept open (step S34).

Then, the internal voltage (V1), external voltage (V), and output current (I1) are measured with the output-limiting resistance switch SW2 being closed (step S34). The internal voltage (V1), external voltage (V), and output current (I1) obtained by this measurement are respectively regarded as an internal voltage (V1_2), external voltage (V_2), and output current (I1_2).

Likewise, the output-limiting resistance switch SW3 is closed with the switch SW0 and output-limiting resistance switches SW1 and SW2 being kept open (step S36).

Then, the internal voltage (V1), external voltage (V), and output current (I1) are measured with the output-limiting resistance switch SW3 being closed (step S36). The internal voltage (V1), external voltage (V), and output current (I1) obtained by this measurement are respectively regarded as an internal voltage (V1_3), external voltage (V_3), and output current (I1_3).

Subsequently, the estimated output current value is calculated based on the internal voltages (V1_1, V1_2, and V1_3), external voltages (V_1, V_2, and V_3), and output currents (I1_1, I1_2, and I1_3) measured in steps S32, S34, and S36.

A practical estimated output current value calculating method will be explained below.

An equation $I1=(V-E2)/R2+V/R3$ holds between the internal voltages (V1_1, V1_2, and V1_3), external voltages (V_1, V_2, and V_3), and output currents (I1_1, I1_2, and I1_3), and the voltage value E2, resistance value R2, and resistance value R3 as unknowns. Therefore, three simultaneous equations $I1\_1=(V\_1-E2)/R2+V/R3$, $I1\_2=(V\_2-E2)/R2+V/R3$, and $I1\_3=(V\_3-E2)/R2+V/R3$ hold. Accordingly, the voltage value E2, resistance value R2, and resistance value R3 are calculated by solving these three simultaneous equations.

In addition, an equation $(E1-V)/R1=(V-E2)/R2+V/R3$ also holds. By substituting the calculated voltage value E2, resistance value R2, and resistance value R3 into this equation, the external voltage V (V_0) when the switch SW0 is closed is calculated. Then, a maximum estimated output current (I1max_0) when the switch SW0 is closed is calculated from an equation $I1max\_0=(V\_0-E2)/R2+V\_0/R3$.

Thus, the maximum estimated output current value (I1max_0) which is estimated when the switch SW0 is closed with the output-limiting resistance switches SW1, SW2, and SW3 being open is calculated (step S38).

Then, whether the calculated maximum estimated output current value (I1max_0) is smaller than a maximum allowable current value (I1max_SW0) as an eigenvalue of the switch SW0 is determined (step S40).

If it is not determined that I1max_0<I1max_SW0 (step S40: NO), the output-limiting resistance switch SW3 is kept closed, and the process waits for a predetermined time (e.g., 60 sec) in order to eliminate the internal-external voltage difference (V1−V) (step S42). After the elapse of the predetermined time, the process returns to step S32.

On the other hand, if it is determined that I1max_0<I1max_SW0 (step S40: YES), i.e., if it is determined that the external load unit 80 can be connected to the circuit unit 20 via the switch SW0, the switch SW0 is closed (step S44). Then, the output-limiting resistance switch SW3 is opened (step S46). Thus, the switch SW0 is closed with the output-limiting resistance switches SW1, SW2, and SW3 being open (step S48).

Note that when the process waits for the predetermined time in step S42, the state of, e.g., the external load unit 80 sometimes changes. For example, when the external load unit 80 includes the constant-current load unit 93, the power supply of the external load unit 80 is turned off during the elapse of the predetermined time, so the constant-current load unit 93 does not include the external load unit 80 any longer in some cases. As another example, when the external load unit 80 includes the battery load unit 82, the external battery 85 may be consumed. As still another example, when the external load unit 80 includes, e.g., a fuse which changes its resistance value due to heat generation, the resistance value as the load value of the external load unit 80 may change if one of the output-limiting resistance switches SW1, SW2, and SW3 is closed. In any of these cases, the determination condition may be satisfied in step S40 after that, and the process may advance to step S44.

The determination result indicating whether the switch SW0 can be closed will be explained below with reference to FIG. 9. FIG. 9 is an example of a switch closing determination feasibility table 50 indicating whether the switch SW0 can be closed.

The switch closing determination feasibility table 50 includes a switch closing determination condition item a indicating a determination condition for determining whether to close the switch SW0, and a constant-current load item b, resistance load item c, and battery load item d each indicating the type of external load which the external load unit 80 presumably includes. This table shows these items for each of the switch closing determination condition of the related art, and that of this embodiment.

In the related art, as indicated by the switch closing determination condition item a corresponding to the related art, whether the absolute value of the internal-external voltage difference (V1−V) is smaller than a predetermined potential difference ΔV, i.e., |V1−V|<ΔV is the switch closing determination condition. Also, in the related art as described previously, it is possible to assume only a case in which the load value of the external load unit 80 or the type of external load of the external load unit 80 is already known.

On the other hand, in this embodiment, I1max_0<I1max_SW0 is the switch closing determination condition as indicated by the switch closing determination condition item a corresponding to this embodiment. Also, in this embodiment as described previously, it is possible to assume even a case in which the load value of the external load unit 80 or the type of external load of the external load unit 80 is unknown.

The constant-current load item a will now be explained. In the related art, the determination criterion of the conventional switch closing determination condition is sometimes not satisfied because the absolute value of the internal-external voltage difference (V1−V) maintains a predetermined value (R1*I1). In a case like this, the battery pack 60 cannot be connected to the external load unit 80.

On the other hand, in this embodiment, when it is determined by load determination that the external load unit 80 includes the constant-current load unit 93, the switch closing determination condition of this embodiment is satisfied when, for example, time elapses, even if the internal-external voltage difference (V1−V) is produced. Therefore, even when the battery pack 60 cannot be connected to the external load unit 80 in the related art, the battery pack 60 can be connected to the external load unit 80 in this embodiment.

Details of the external load estimation method and determination method such as load determination will be explained below.

For example, when the calculated voltage value E2 is a negative value (e.g., −100 V) and the calculated resistance value R2 is about 11Ω, it is possible to estimate that the type of external load of the external load unit 80 is the constant-current load unit 93. Also, when the calculated estimated output current value is a few-ten-ampere-order value, it is possible to estimate that the load value of the constant-current load 93 is also a few-ten-ampere-order value. Note that when the load value of the constant-current load 93 is on the order of a few ten amperes, this means that the current value is relatively small when assuming a case in which the battery pack 8 is a battery pack including, e.g., a lithium-ion battery. In this case, it is estimated that no large current flows even when the switch SW0 is closed, so it is possible to determine that the circuit unit 20 and external load unit 80 can be connected via the switch SW0.

Also, when the calculated resistance value R3 is a mega-order value (e.g., 1 MΩ), it is possible to estimate that the type of external load of the external load unit 80 is the resistance load unit 92. In addition, since the calculated resistance value R3 is a mega-order value, it is estimated that the load value of the estimated resistance load unit 92 is a mega-order resistance value. In this case, it is estimated that no large electric current flows even when the switch SW0 is closed because the resistance value R3 is large, so it is possible to determine that the circuit unit 20 and external load unit 80 can be connected via the switch SW0.

Furthermore, when, for example, the calculated voltage value E2 is 20 V and the calculated resistance value R2 is a milliohm-order value (e.g., 10 mΩ), it is possible to estimate that the type of external load of the external load unit 80 is the battery load unit 82. Since the calculated resistance value R2 is a milliohm-order value, it is possible to estimate that the load value of the battery load unit 82 is also a milliohm-order resistance value. Note that when the external load unit 80 thus includes the battery load unit 82, the internal-external voltage difference (V1−V) must be reduced over a long time in order to prevent heat generation caused by, e.g., the output-limiting resistors 72, 34, and 36. As will be described later, therefore, the switch SW0 cannot be closed unless the internal-external voltage difference (V1−V) is reduced.

The resistance load item b will be explained below with reference to FIG. 9 again.

In the related art, the determination criterion of the conventional switch closing determination condition is sometimes not satisfied because the absolute value of the internal-external voltage difference (V1−V) maintains a predetermined value (E1−E1(R3/(R1+R3))). In this case, the battery pack 60 cannot be connected to the external load unit 80.

On the other hand, in this embodiment, when it is determined by load determination that the external load unit 80 includes the resistance load unit 92, the switch closing determination condition of this embodiment is satisfied when, for example, time elapses, even if the internal-external voltage difference (V1−V) is produced. Therefore, even when the battery pack 60 cannot be connected to the external load unit 80 in the related art, the battery pack 60 can be connected to the external load unit 80 in this embodiment.

Figure 2:
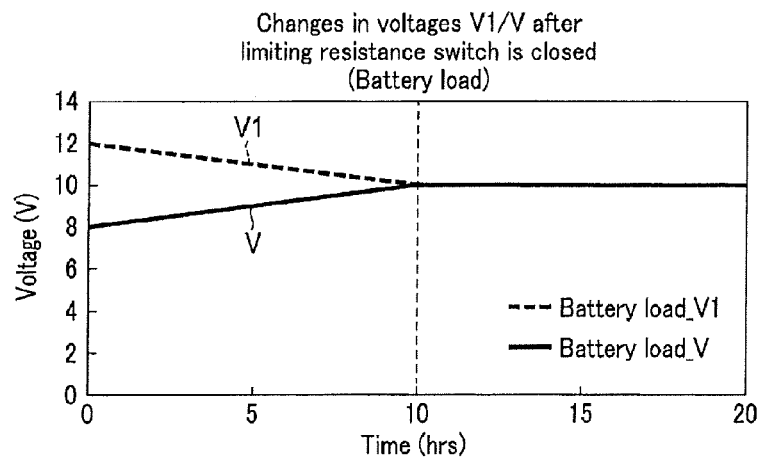
FIG. 2 is a graph schematically showing examples of changes in internal voltage and external voltage with time, when a battery control method performed by the conventional battery pack is applied, and the external load unit includes a battery load unit.

Next, the battery load item c will be explained. In the related art, the absolute value of the internal-external voltage difference (V1−V) decreases with the elapse of time. Accordingly, as described earlier with reference to FIG. 2, the battery pack 60 can finally be connected to the external load unit 80 via the switch SW0 after the elapse of a few ten hours.

On the other hand, in this embodiment, when it is determined by load determination that the external load unit 80 includes the battery load unit 82, the absolute value of the internal-external voltage difference (V1−V) decreases with the elapse of time. Therefore, the battery pack 60 can finally be connected to the external load unit 80 via the switch SW0.

Furthermore, in this embodiment, the resistance value R2 is estimated as a load value by load determination, unlike in the related art. Also, the estimated output current value is calculated. When the resistance value R2 is large, for example, a small value is calculated as the estimated output current value. As in the related art, therefore, the battery pack 60 can be connected to the external load unit 80 via the switch SW0 after the elapse of time shorter than a few ten hours.

FIG. 10 assumes a case in which the control method of the battery pack 8 of this embodiment is applied, and the external load unit 90 includes the resistance load unit 92. FIG. 10 is a graph schematically showing examples of changes in internal voltage V1 and external voltage V with time when the switch SW0 is closed in this case.

Referring to FIG. 10, the abscissa indicates the time on the order of seconds, and the ordinate indicates the voltage (V). Initially, the internal voltage V1 is 10 V, and the external voltage V is about 6.5 V. After that, the control method of the battery pack 8 of this embodiment is applied, so the switch SW0 can be closed in ten-odd seconds (ten seconds in FIG. 10) on the order of seconds. FIG. 10 shows that the internal voltage V1 and external voltage V take a predetermined value (about 8.3 V in FIG. 10) after that.

This embodiment as described above can achieve the following effects.

The external load unit 80 is modeled by using the three parameters, i.e., the voltage value E2, resistance value R2, and resistance value R3. In accordance with this modeling, the three output-limiting resistance units 72, 34, and 36 are switched in descending order of resistance value. Then, the three parameters are calculated from equations using the internal voltage (V1), external voltage (V), and output current (I1) measured by switching like this. By thus calculating the three parameters, it is possible to determine whether it is safe to connect the battery pack 8 to the external load unit 80. More specifically, it is possible to estimate the type of external load of the external load unit 80, and the estimated output current value as an output current value when the switch SW0 is closed. Therefore, even when the internal-external voltage difference (V1−V) is large, for example, the switch SW0 can be closed if it is determined that the estimated external load is one of (1) the battery load unit 82 having a high internal resistance, (2) the resistance load unit 92 having a large resistance value, and (3) the constant-current load unit 93 having a small current value.

Also, the controller 10 of the battery pack 8 can estimate an external load to be connected. This makes safe reliable connection to the external load unit 80 possible within a time shorter than that in the related art.

More specifically, even when the external load unit 80 includes the resistance load unit 92 and the switch SW0 can safely be closed, the switch SW0 cannot be closed in the related art because the internal-external voltage difference (V1−V) does not disappear. In this embodiment, however, the type of external load is estimated in at least a few ten seconds, and the switch SW0 can be closed if it is determined that the switch SW0 can safely be closed.

In addition, since the external load unit 80 is modeled by using the three parameters as described above, the type of external load can be estimated even when, for example, the external load unit 80 includes the constant-current load unit 93. If it is determined that the switch SW0 can safely be closed, the switch SW0 can be closed in this case as well.

Furthermore, even when the type of external load is unknown, the battery pack 8 can safely be connected to the external load unit 80. In other words, the battery pack 8 such as a lithium-ion battery can be used in various applications.

As described above, the embodiment of the present invention provides a battery pack and control method for safely connecting an external load.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A battery pack for connecting an external load via a switch, the battery pack comprising:
   an output current-limiting resistor arranged between an internal battery of the battery pack and the external load, wherein the output current-limiting resistor is used to limit an output current value to be output to the external load, and wherein the output current-limiting resistor is configured to implement three different resistance values of a first resistance value, a second resistance value, and a third resistance value;
   a switching module configured to switch a resistance value of the output current-limiting resistor to one of the first resistance value, the second resistance value, and the third resistance value;
   a measurement module configured to measure the output current value and a voltage value of the external load, for each of the first resistance value, the second resistance value, and the third resistance value; and a control module configured to perform control of the switch (SW0),
wherein the control module is configured to:
calculate maximum estimated output current value to be output to the external load via the switch (SW0) based on the measurement result; and
control for connecting the external load to the battery pack via the switch (SW0) without the output current-limiting resistor when the maximum estimated output current value is smaller than a maximum allowable current value of the switch (SW0).

2. The battery pack of claim 1,
wherein the first resistance value is larger than the second resistance value, and the second resistance value is larger than the third resistance value, and
wherein the switching module performs switching in an order of the first resistance value, the second resistance value, and the third resistance value.

3. The battery pack of claim 1,
wherein the external load comprises a circuit comprising an external battery, an external battery resistor connected in series with the external battery, and a resistance load connected in parallel to the external battery and the external battery resistor.

4. The battery pack of claim 1, wherein the external load comprises at least one of a battery load, a resistance load, and a constant-current load.

5. The battery pack of claim 1, wherein the output current-limiting resistor comprises at least two parallel-connected fixed resistors or a variable resistor.

6. A method for controlling output of a battery pack for connecting an external load via a switch, the method comprising:
switching a resistance value of an output current-limiting resistor arranged between an internal battery of the battery pack and the external load to one of a first resistance value, a second resistance value, and a third resistance value, wherein the output current-limiting resistor is used to limit an output current value to be output to the external load, and wherein the output current-limiting resistor is configured to implement three different resistance values of the first resistance value, the second resistance value, and the third resistance value;
measuring the output current value and a voltage value of the external load, for each of the first resistance value, the second resistance value, and the third resistance value;
calculating maximum estimated output current value to be output to the external load via the switch (SW0) based on the measurement result; and
performing control for connecting the external load to the battery pack via the switch (SW0) without the output current-limiting resistor when the maximum estimated output current value is smaller than a maximum allowable current value of the switch (SW0).

* * * * *